United States Patent [19]

Odobasic

[11] Patent Number: 4,521,003
[45] Date of Patent: Jun. 4, 1985

[54] TORSION LINK

[76] Inventor: Steven L. Odobasic, P.O. Box 21906, Denver, Colo. 80221

[21] Appl. No.: 412,095

[22] Filed: Aug. 27, 1982

[30] Foreign Application Priority Data

Sep. 15, 1981 [GB] United Kingdom ............... 8127751

[51] Int. Cl.³ .................. B60G 11/18; B64C 27/48; F16F 1/14
[52] U.S. Cl. ................... 267/57.1 A; 267/63 A; 267/141.1; 267/153; 267/154; 403/228; 416/134 A; 416/141; 464/97
[58] Field of Search ............... 267/57.1 R, 57.1 A, 267/63 A, 141.1, 141.2, 153, 154, 152; 464/94, 96, 97; 416/134 A, 141; 403/220, 225, 228, 291, 222, 224

[56] References Cited

U.S. PATENT DOCUMENTS

| 1,720,545 | 7/1929 | Dickey | 267/141.1 X |
|---|---|---|---|
| 2,216,455 | 10/1940 | Piron | 267/57.1 R |
| 2,246,833 | 6/1941 | Beemer | 403/225 X |
| 2,251,698 | 8/1941 | Willson | 267/57.1 A |
| 2,267,312 | 12/1941 | Smith | 267/57.1 R |
| 2,378,099 | 6/1945 | Piron | 403/220 |
| 2,448,769 | 9/1948 | Chamberlain | 403/222 X |
| 2,531,059 | 11/1950 | Krotz | 267/57.1 R |
| 2,575,533 | 11/1951 | Seibel | 416/138 |
| 2,940,785 | 6/1960 | Haushalter | 267/57.1 R |
| 3,020,036 | 2/1962 | Kleinschmidt | 267/154 |
| 3,052,305 | 9/1962 | Jones et al. | 416/21 |
| 3,261,407 | 7/1966 | Culver et al. | 416/112 |
| 3,330,362 | 7/1967 | Kastan | 416/132 R |
| 3,342,041 | 9/1967 | Nebiker, Jr. | 403/224 X |
| 3,666,301 | 5/1972 | Jorn | 267/57.1 A |
| 3,669,566 | 6/1972 | Bourquardez et al. | 416/134 R |
| 3,690,639 | 9/1972 | Brandon et al. | 267/57.1 R |
| 3,765,267 | 10/1973 | Bourquardez et al. | 74/581 |
| 3,787,102 | 1/1974 | Moran | 267/57.1 R |
| 3,791,234 | 2/1974 | Kastan et al. | 74/579 R |
| 3,797,964 | 3/1974 | Hanson | 416/134 R |
| 3,855,817 | 12/1974 | Stuemky et al. | 464/51 |
| 3,881,711 | 5/1975 | Lemaitre | 267/57.1 R |
| 3,905,208 | 9/1975 | Oyama et al. | 464/88 |
| 4,007,924 | 2/1977 | Jorn et al. | 267/57.1 R |
| 4,111,605 | 9/1978 | Roman et al. | 416/141 |
| 4,171,920 | 10/1979 | Kramer et al. | 267/154 |
| 4,222,709 | 9/1980 | Mouille | 416/134 A |
| 4,349,184 | 9/1982 | Peterson et al. | 403/228 X |
| 4,352,631 | 10/1982 | Buchs et al. | 416/134 A |

FOREIGN PATENT DOCUMENTS

| 286604 | 10/1952 | Switzerland | 403/222 |
|---|---|---|---|
| 748587 | 12/1953 | United Kingdom . | |
| 851377 | 11/1957 | United Kingdom . | |
| 2105818 | 3/1983 | United Kingdom | 267/57.1 R |

OTHER PUBLICATIONS

F. P. J. Rimrott, "Two Secondary Effects in Bending of Slit Thin-Walled Tubes", *Journal of Applied Mechanics*, Mar. 1966, pp. 75-78.

Primary Examiner—Douglas C. Butler
Assistant Examiner—Richard R. Diefendorf
Attorney, Agent, or Firm—Howson and Howson

[57] ABSTRACT

A structural element capable of resilient twisting about an axis including a plurality of axially extending open section members of decreasing transverse dimension nested together with adjacent ends of the members being rigidly interconnected at each end of the element.

44 Claims, 15 Drawing Figures

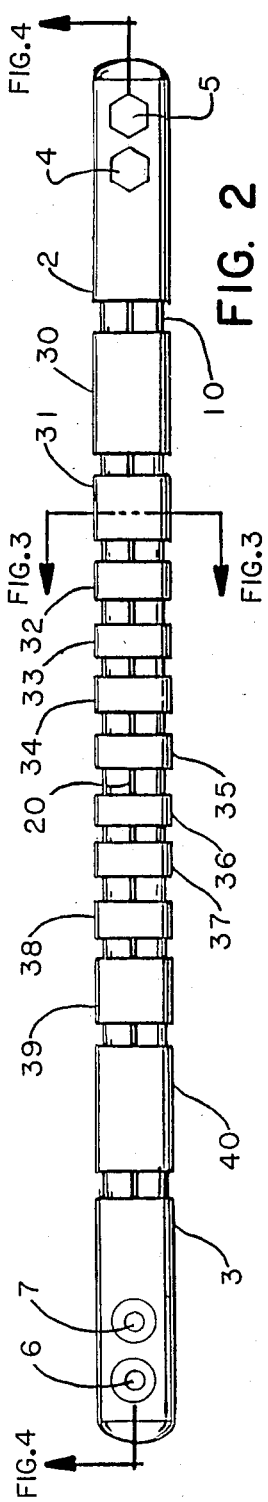
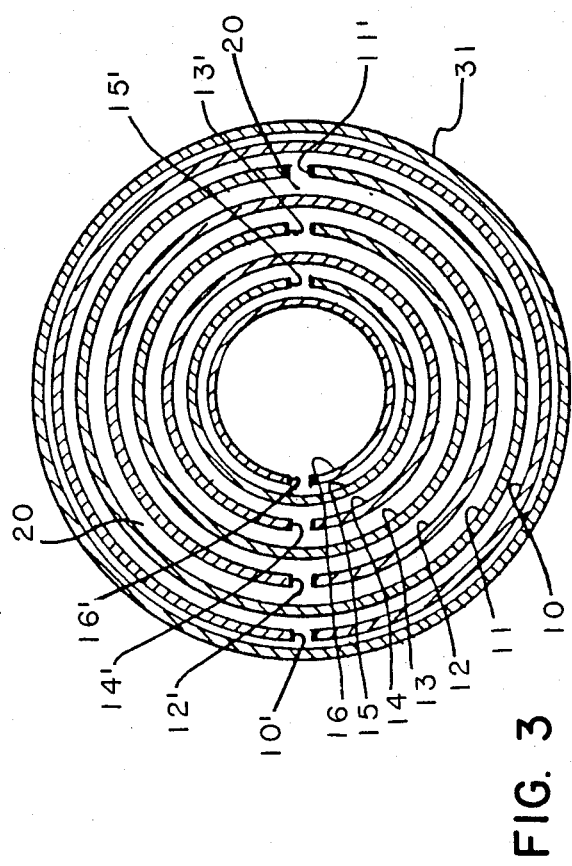
FIG. 2
FIG. 3

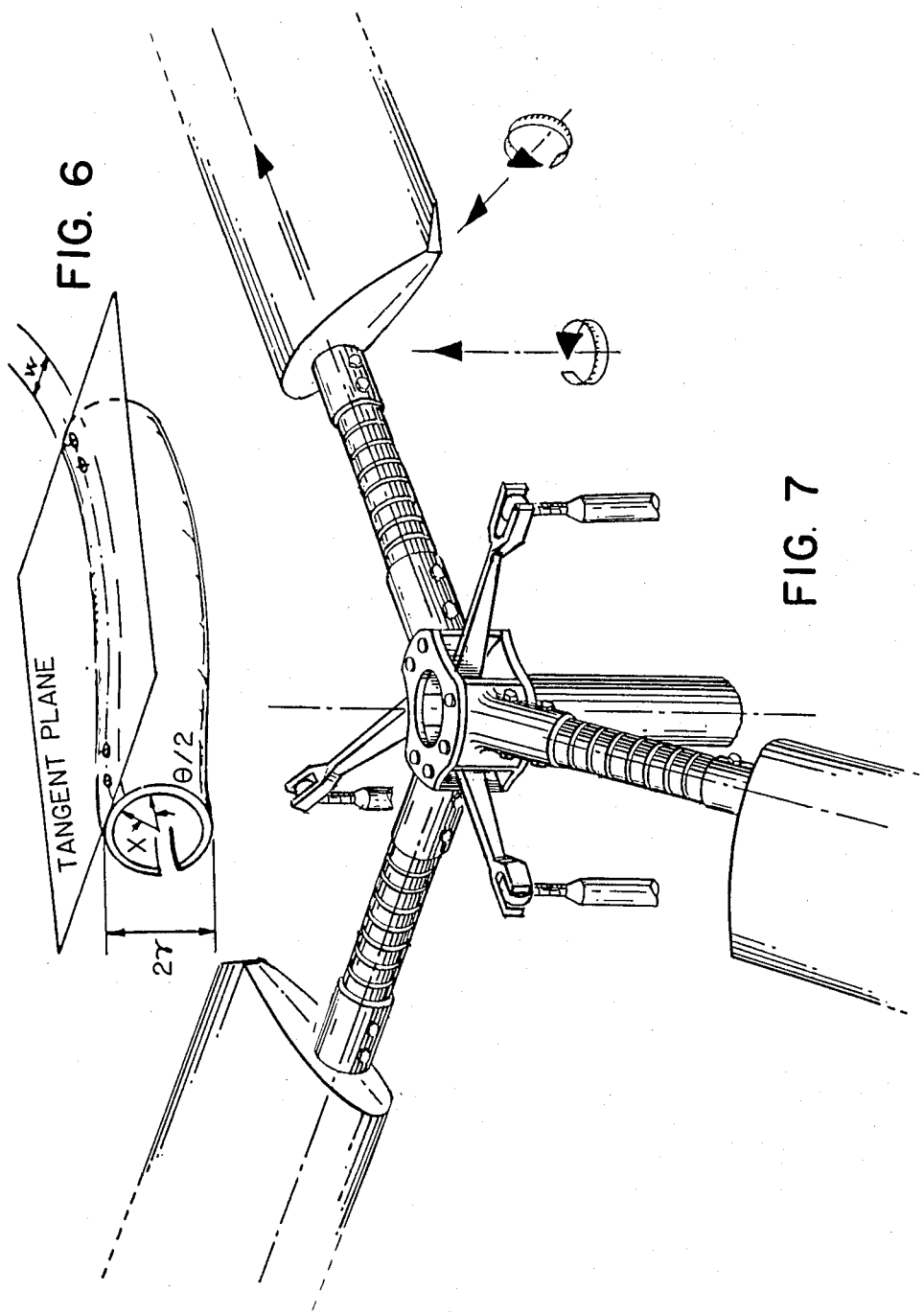

TORSION LINK

This invention relates to mechanical torsion link structures and in particular to torsion links which comprise a composite of elastomeric materials in combination with other materials such as metal.

In the past many structures have been devised which incorporate elastomeric materials in combination with various metal configurations to provide useful bearing or coupling structures for a wide variety of applications.

Of particular interest have been the structures proposed for use in helicopter rotor root designs due to the severe requirements of such use. In particular patents such as U.S. Pat. Nos. 4,142,833; 3,690,639; 3,750,249; 4,037,988 and 3,787,102. The patents disclosed and discussed therein provide an excellent review of some of the efforts to provide mechanical elements to function as bearings or linkages in helicopter applications. Further structures disclosed in this art include the use of laminated metal straps, plates, rubber or rubber and metal composite belts and the like as well as filaments and filament bundles embedded in a wide variety of elastomeric materials.

As described further in the hereinbefore identified patent literature and others, the initial experiences with elastomeric bearing designs have been somewhat disappointing. The thorough and well reasoned analysis of these early results and the extensive study of the applied forces and their resultant effect were applied almost exclusively to designs which employed metal reinforcing in the form of longitudinal or helically wound strips embedded in elastomer, or cylindrical structures in various configurations which seemed to address the problems encountered only from the point of view of reinforcement of the elastomer.

The prior devices utilizing as they did reinforced elastomeric materials encountered many drawbacks, some of which are detailed in the aforementioned patents. The prior reliance on the properties of the elastomer as modified by the incorporation of reinforcing materials is believed to be one of the principal reason for the results obtained.

It is therefore an objective of the present invention to provide a new mechanical element incorporating metal elements and elastomer which overcome some of the previously encountered problems.

It is a further object of the present invention to provide a new mechanical element which is suitable for a wide variety of design applications. Another object of this invention is to provide a mechanical or structural element that is resilient to twisting moments about one of three mutually perpendicular axes while being relatively resistant to deformations or displacements due to other forces or moments acting along or about other axes.

The prior problems have been eliminated by providing a plurality of differing cross-sectional sizes of open sections of metal nested or arrayed together in a manner which provides interstitial space between the sections. Elastomeric material is then incorporated into these spaces. When constructed according to this invention with retaining rings as further described hereinafter the novel mechanical element of this invention will, when properly mounted, meet all of the function requirements encountered by torsion links for an extremely wide variety of applications including helicopter rotor root assemblies.

The invention will now be described, by way of example, with reference to the accompanying drawings, in which:

FIG. 2 is a side elevational view of the elastomeric torsion link of FIG. 1.

FIG. 3 is a cross-sectional view of the torsion link of FIG. 2 taken along the lines and arrows 3—3.

FIG. 6 is a pictorial perspective view of the distribution of distortion forces in a plane tangent to the surface of a circular open section.

FIG. 7 is a pictoral representation of the torsion link of the present invention utilized in a helicoptor rotor root design embodiment.

Figure 1:
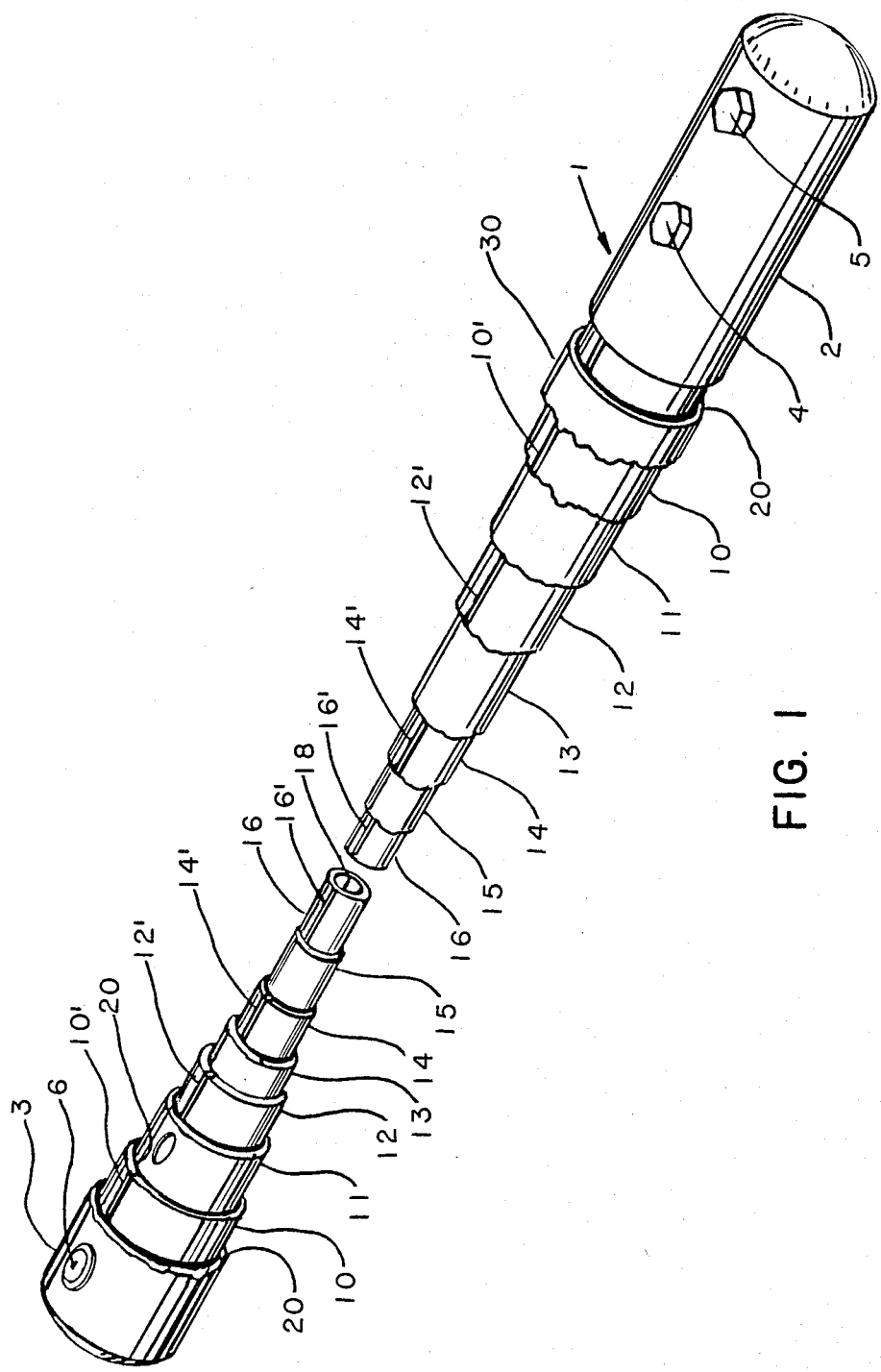
FIG. 1 is a partially broken perspective view of one embodiment of the elastomeric torsion link of the present invention.

In FIG. 1, the embodiment of the elastomeric torsion link 1 of the present invention is shown with cylindrical end caps 2 and 3 shown with fasteners 4, 5 and 6 in place. The concentric open sections 10, 11, 12, 13, 14, 15 and 16 are shown with the outermost sections broken so as to disclose the successive adjacent inner sections and the locations respectively of the openings or slits in open sections 10, 12, 14 and 16 designated as 10', 12', 14' and 16'. The darker shading in the spaces between concentric open sections is elastomer 20, which is shown filling the open space and the slits 10', 12, 14' and 16'. The respective relative locations of the slits on the open sections 11, 13 and 15 will be more clearly shown hereinafter. Likewise, it will be seen in the preferred embodiment shown, that the center of open section 16, designated as 18 is empty space. It can be filled with elastomer if necessary due to fabrication techniques or desirable for a particular application but is shown here as empty since it normally does not need to be filled. Further the elastomer 20 between the open sections need not be continuous as long as its function as described hereinafter is maintained in a given application.

FIG. 2 shows a side elevational view of the complete torsion link of FIG. 1. Here it can be seen that concentric tubular elements 30, 31, 32, 33, 34, 35, 36, 37, 38, 39 and 40 are received on outermost open section 10 and spaced from each other so as to be independently displaced angularly during any twisting of the link where one end is fixed or otherwise angularly displaced in an opposite direction to the angular displacement imparted to the opposite end or to a lesser or greater angular displacement in the same direction. The size, position and relative spacing of the tubular elements can of course be varied depending on the particular design criteria, however, as will be more fully explained hereinafter the device shown in FIG. 2 demonstrates adherence to the principles applicable to this torsion link.

FIG. 3 is a cross-sectional view of the torsion link of FIG. 2 with the orientation of the slits 10', 12', 14', 16', 11', 13' and 15' shown where the even numbered slits are 180° from the odd numbered slits. The open areas within outer tube 31 in FIG. 2 show where the elastomer 20 is located in this section. The outer tube 31 is also indicated. While again the elastomer torsion link of the present invention is shown in this embodiment with a specific slit orientation it is possible to pick almost any orientation as long as the function of the device is not impaired. For some applications with certain open section materials and wall thicknesses, when combined with specific elastomers, it can even be possible to have the slits of adjacent open sections aligned. Typically, it will be preferable to have some regular or random displacement of the slits of adjacent tubes so that they are not all aligned. The optimum locations will vary, however, the best locations can be obtained without undue experimentation for any given application.

Figure 4:
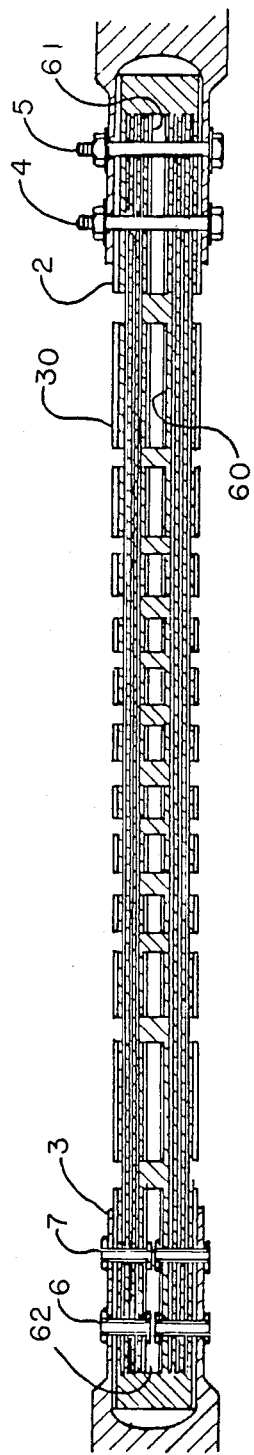
FIG. 4 is a cross-sectional view of the torsion link of FIG. 2 taken along the lines and arrows 4—4.

FIG. 4 shows a cross-sectional view of another embodiment of the present invention where the space inside the innermost open section of the array contains a tube 60 similar to the tube 30 on the outside. As indicated previously there can be a multiplicity of these tubes spaced typically as shown or even smaller numbers than shown and even ultimately only one tube not fastened at either end to the end caps 2 or 3. It is preferred, also, to compliment the inside of the array at the end caps 2 and 3 with tubular members 61 and 62 for positive mechanical attachment of the fasteners 4, 5 and 6 and 7 for reasons more fully described hereinafter.

Figure 5:
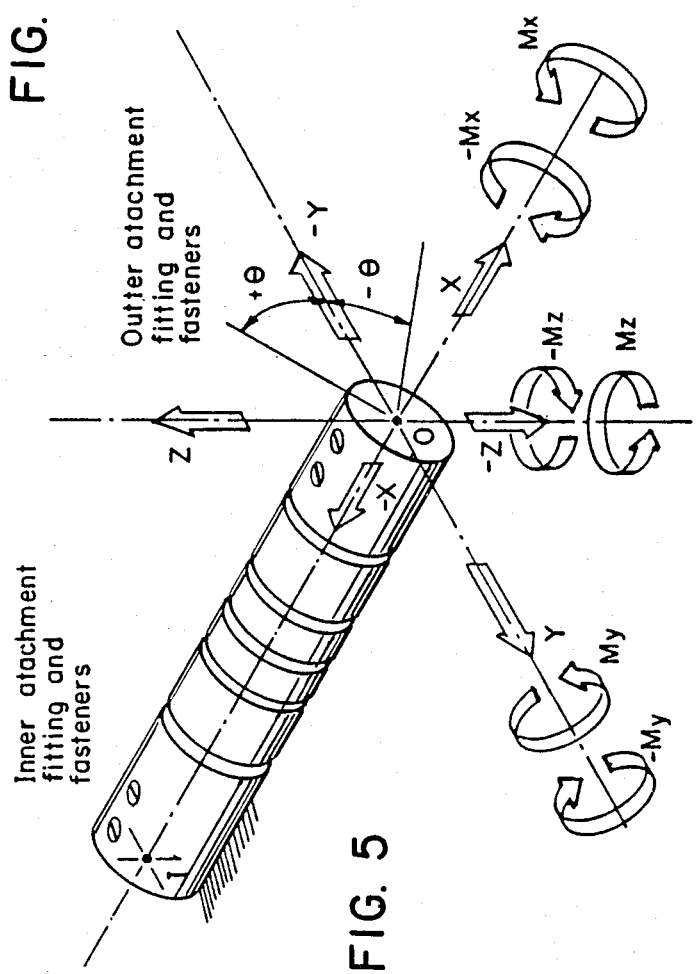
FIG. 5 is a pictoral perspective view graphically showing the forces and displacements that the torsion link of the present invention can encounter in use.

FIGS. 5 and 6 are graphical representations of the forces which ideally will act upon the torsion link of the present invention and will be related herein to the mathematical analysis required for understanding the suitability of a particular structure for the novel design applications it is capable of undertaking.

Figure 8:
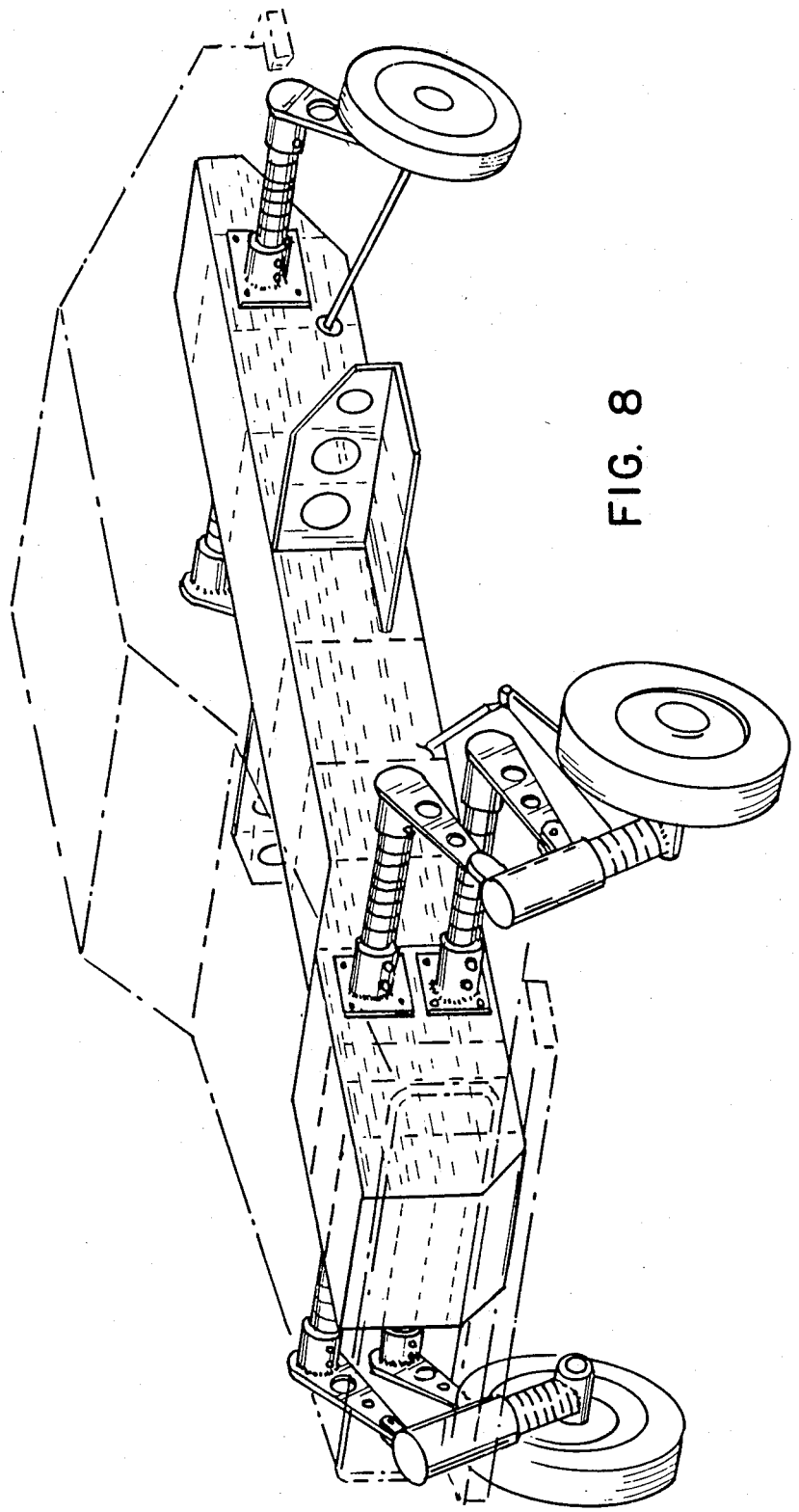
FIG. 8 is a pictorial representation of the torsion link of the present invention utilized in several motor car design embodiments.

FIGS. 7 and 8 schematically represent applications where the torsion link of the present invention can be advantageously employed. For example, in the helicopter application shown in FIG. 7 the ability of the link to withstand substantial tension as well as transverse forces or two plane bending moments at the end affixed to a rotor blade makes this application particularly attractive and would greatly simplify existing structural designs for such equipment. Likewise, in the conceptual drawing of a motor car in FIG. 8 several torsion links are employed at various well known points to take advantage of the unique properties of this novel structural and mechanical element with the overall result that a simple, more reliable and extremely light structure could be provided.

The embodiments described for the new mechanical structure of the present invention show broadly how open section metal tubes i.e. having a longitudinal slit, can be assembled in a concentric array to achieve the objectives of the present invention as a flexible torsion link capable of flexure, to resist bending moments, tension, compression and transverse forces. These are properties normally not associated with open sections. Functionally this is achieved in a variety of ways depending on the particular application. For example, the elastomeric filling between the tubes helps resist the deformation normally associated with torsion and flexing an open section. Optionally further resistance to deformation can be provided with spaced sleeves encircling the torsion link which are mounted to be independant and unaffected by the twisting torques applied to the ends of the link. Further, in the embodiments shown, the mounts for the end of the link are designed to prevent lateral displacement of the tube ends which structure of necessity must cooperate with the elastomer and sleeves to achieve the novel effect of this element.

Many variables are present in the structure of the current device which must be considered when evaluating any particular design application. For example, the metal selected, the wall thickness of the open section, the width of the slit, the location of the slit for each adjacent concentric open section with respect to the location of the slit of the next adjacent open sections, the thickness of the space between concentric open sections to be completely or partially filled with elastomeric material, the properties of the elastomeric material itself in terms of manufacturing constraints, adhesion to the metal components, internal shear strength and the like must all be evaluated. Of course the overall outside dimensions of the link, the number of concentric open sections needed and the manner of mounting must also be considered.

The following theoretical analysis of the interaction of all these and other variables will give guidance to a designer in establishing how a specific structure must be made to satisfy specific criteria for any given application problem.

The following Table I of symbols and units will be applicable to the calculations shown.

TABLE I

| | SYMBOLS AND UNITS |
|---|---|
| U | strain energy (lb. × in.) |
| E | Young's modulus of elasticity (lb/in$^2$) |
| $\sigma$ | tensile or compressive stress (lb/in$^2$) |
| $\nu$ | Poisson's coefficient (dimensionless) |
| $\tau$ | shear stress (lb/in$^2$) |
| V | volume (in$^3$) |
| Z | flexural modulus (in$^3$) |
| $r_m$ | mean slit tube radius (in.) |
| $t_{opt}$ | optimum slit tube wall thickness (in.) |
| G | shear modulus (lb/in$^2$) |
| $\theta$ | angular displacement (radians) |
| $\theta°$ | maximum angular displacement in radians |
| L | length or distance between innermost fasteners (in.) |
| $\zeta$ | is the axial stress amplification function |
| $\psi$ | is the shearing stress amplification function |
| $\dfrac{r_m}{t_{opt}}$ | aspect ratio of a slit tube (dimensionless) |
| $\sigma w$ | working stress (lb/in$^2$) |
| $\sigma y$ | yield stress (lb/in$^2$) |
| $\dfrac{L}{r_m}$ | slenderness ratio (dimensionless) |
| n | number of slit tubes in parallel (dimensionless) |
| $n_F$ | number of fasteners between slit tubes and end fittings (dimensionless) |
| $\dfrac{M_x}{\theta}$ | torsional stiffness (lb. in/degree) |
| $\delta$ | is the torsional stiffness amplification function |
| $\theta/L$ | maximum angular displacement per unit of length (degrees/in.) |
| $\tau_y$ | yield stress in shear (lb/in$^2$) |
| $\sigma_{blo}$ | bearing strength (lb/in$^2$) |
| $\sigma_p$ | principal stress (lb/in$^2$) |
| $M_1$ | resultant bending moment per slit tube (lb × in) |
| $r_{om}$ | mean radius of outermost slit tube (in.) |
| $t_R$ | rubber layer thickness (in.) |
| $\left(\dfrac{r_{om}}{t_{opt}}\right)_{crit}$ | critical aspect ratio of the outermost tube (dimensionless) |

TABLE I-continued
SYMBOLS AND UNITS

| | |
|---|---|
| $\delta$ | distance between two subsequent slit tube central lines, or the pitch (spacing) (in.) |
| $r_o$ | radius of outermost fibers (outer tube) (in.) |
| $r_{omdd}$ | mean radius of outermost radius at which descending lamination discontinues. The subscript 'dd' stands for "discontinuous descent" of laminates (in.) |
| I | moment of inertia (second moment of area) completely laminated circular section (in$^4$) |
| Z | flexural modulus, completely laminated circular section (in$^3$) |
| A | area, completely laminated circular section (in$^2$) |
| $I_{dd}$ | moment of inertia (second moment of area) partially laminated circular section (in$^4$). |
| $Z_{dd}$ | flexural modulus, partially laminated circular section (in$^3$) discontinuous descent of laminations at |
| $A_{dd}$ | area, partially laminated circular section (in$^2$) |
| $\epsilon$ | eccentricity or off-set between neutral axis and the point of load application (in.) |
| N.A. | neutral axis location (dimensionless) |
| $F_{EUL}$ | Euler's critical load (lb.) |
| $\sigma_{EUL}$ | Euler's critical stress (lb/in$^2$) |
| $\sigma_{CR.0}$ | critical compressive stress acting independently (lb/in$^2$) |
| $\sigma_{CR}$ | critical compressive or tensile stress during shearing (lb/in$^2$) |
| $\tau_{CR.0}$ | critical shearing stress acting independently (lb/in$^2$) |
| $\tau_{CR}$ | critical shearing stress during compression or tension (lb/in$^2$) |
| $M_{22}$ | is the bending moment applied to the outer attachment fitting (lb × in) |
| $T_{22}$ | is the total shearing force resisted by outer attachment fitting (lb) |
| P | is axial tensile or compressive load applied to the outer attachment fitting (lb) |
| $T_z$ | is the component of total shearing force applied along the 'z' axis (lb) |
| $T_y$ | is the component of total shearing force applied along the 'y' axis (lb) |
| $r_m$ | is the mean slit tube radius (in) |
| $M_z$, $M_y$ | flapwise and dragwise ultimate bending moments (lb × in) |

Table II is a bibliography of the references whose theoretical analysis provide the foundations for the basic calculations required when approaching a given design problem utilizing the assumptions required herein.

TABLE II

Saint Venant "De la Torsion . . ." T. XIV de l' Academie des Sciences, Paris, 1855
Saint Venant "Mem. des Savants Etrangers" T. XIV, Paris 1855
C. F. Kollbrunner et al. "Torsion in Structures", Springer-Verlag, Berklin, Heidelberg, New York, 1969.
S. Timoshenko "Strength of Materials" Part I, D. van Nostrand Company, Inc., 1930
A. E. Green "The Equilibrium and Elastic Stability of a Thin Twisted Strip", Proc. Royal Society, London, Series A, vol. 154, 1936
Bredt, V.D.I., vol. 40, page 815, 1896
Buckley "The Bifilar Property of Twisted Strips", Phil. Mag. page 778, 1949
NACA, Technical note 2661, P. Kuhn et al., Langley Aeronautical Laboratory
H. Wagner et al., "Tension Fields in Originally Curved Thin Sheets during Shearing Stresses" NACA TM 774, 1935
R. Roark, "Formulas for Stress and Strain" 4th edition, McGraw-Hill Book Co., New York, St. Louis, San Francisco, London, Mexico, Sydney, Toronto
P. J. Geary "Torsion Devices" a survey of instrument parts no. 3 BSIRA research report R249 1960

TABLE II-continued

S. Timoshenko "Theory of Elastic Stability"
H. Wagner "Funfundzwanzig Jahre Technische Hochschule Danzig" Festschrift, page 329.
C. M. Seibel "Rotor Mounting and Control" U.S. Pat. No. 2575533, 1947
J. F. Jones, et al. "Torsional Deflection Rotor Mounting" U.S. Pat. No. 3052305, 1958
W. L. Cresap "Helicopter Rotor System", U.S. Pat. No. 3026942, 1959
I. H. Culver, et al. "Helicopter Rotor System", U.S. Pat. No. 3261407, 1966
H. Kastan "Helicopter Rotor", U.S. Pat. No. 3330362, 1967

In theory, if a thin walled open section is subjected to torsion, an induced tensile-compressive stress is generated. This stress can be calculated according to the following formula, where:

$\sigma_i$ is the induced axial stress (lb/in$^2$); G is the shear modulus of slit tubes in (lb/in$^2$); $\theta$ is the angular displacement (radians); t is the wall thickness (in); L is the length of the link or the distance between the innermost fasteners (in) and $\nu$ is Poisson's Ratio:

$$\sigma_i = \frac{G\theta t}{L} \sqrt{2(1 + \nu)}$$

This relationship shows that the induced axial stress is proportional to Saint Venant's shearing stress. Additionally even though the amplified shearing stresses are orthogonal to $\sigma_i$ both increase with increases in the wall thickness (t).

However, the second component of axial stresses, generated by external bending moments, decreases with wall thickness 't', since in general, the flexural modulus is proportional to 't'.

For example, in the case of a thin-walled slit tube $$\sigma = \frac{M_1}{\pi r^2 t}$$

From this, the principal stress whose components are $\Sigma\sigma$ and $\Sigma\tau$, will have minimum value when $$\frac{\partial \sigma_p}{\partial t} = 0$$

By this condition an optimum wall thickness '$t_{opt}$' follows for which Rankine's theory of failure $$\sigma_p \leq \sigma_{crit}$$

is best satisfied.

The critical stress '$\sigma_{crit}$' of a thin-walled section is inversely proportional to the higher power of its aspect ratio (r/t).

However, the highest possible aspect ratios (r/t) are necessary to augment the flexural modulus. For example, the flexural modulus of a slit tube is proportional to the square of its aspect ratio:

$$Z = \pi r^2 t = \pi \left(\frac{r}{t}\right)^2 \times t^3 \text{ (in}^3\text{)}$$

Since "total strain energy" and "shear strain energy" theories of failure are more restrictive than Rankine's, the optimum wall thickness expression is derived from a condition for minimum strain energy of a system subjected to simultaneous bending and torsion.

$$U = \frac{1}{2E}[\sigma^2 + 2(1+\nu) \times \tau^2] \times V \text{ (lb} \times \text{in)}$$

$$\sigma = \frac{M_1 \phi}{Z} = \frac{M_1 \phi}{\pi \times r^2 \times t} \left(\frac{\text{lb}}{\text{in}^2}\right)$$

$$M_1 = \frac{1}{N}\sqrt{M_z^2 + M_y^2} \text{ (lb} \times \text{in)}$$

$$\phi = \left[1 + \frac{T_{22}LN\pi r^2 t}{2M_{22}} + N\frac{\theta^\circ G t^2 r^2 \pi^2 \sqrt{2(1+\nu)}}{180 \, L \, M_{22}} + \frac{P \times r}{2M_{22}}\right]$$

$$\tau = \frac{G\theta r \psi}{L}\left(\frac{\text{lb}}{\text{in}^2}\right)$$

$$\psi = \left[\sqrt{\gamma} + \frac{(T_z + T_y) \, 180 \, L}{N \times \pi^2 \times G\theta^\circ \times t^2 \times r} + \frac{\gamma}{\left(\frac{r}{t}\right)}\right]$$

$$v = 2r\pi \times L \text{ (in}^3)$$

$$\gamma = \left\{\frac{A \times B}{\left[C - \left(\frac{r}{t}\right)\left(\frac{r}{L}\right)\right]} + \frac{\left(\frac{r}{t}\right)^2}{D}\right\} \quad 1 < A < 2.6;$$

$$B = 3.5; \, C = 4; \, D = 570$$

$$t_{opt} \text{ (Ult.)} = \left\{\frac{1}{2\pi^4(1+\nu)}\left[\frac{180}{G}\right]^2\right\}^{1/6} \times \left\{\frac{M_1\left(\frac{L}{r}\right)\left(\frac{\phi}{\psi}\right)}{\left(\frac{r}{t}\right) \times \theta^\circ}\right\}^{\frac{1}{3}} \text{(in)}$$

Taking the fatigue limit or number of cycles till failure as a criterion, the second optimum thickness becomes:

$$t_{opt} \text{ (Alt.)} = \sqrt[3]{\frac{M_{alt}}{N\pi\left(\frac{r}{t}\right)^2 \sigma_{all.}}}$$

The optimum wall thickness may also be determined by the expression for principal stress:

$$\sigma_p = \frac{1}{\sqrt{2}} \phi \left(\frac{M_1}{2r^2\pi tN} + C\frac{G\theta t}{L}\right)$$

in terms of the aspect ratio $\sigma_p$ becomes:

$$\sigma_p = \frac{1}{2}\phi\left[\frac{M_1}{2N\pi\left(\frac{r}{t}\right)^2 t^3} + C\frac{G\theta t}{L}\right]$$

If (r/t) and ($\theta$/L) are limited by elastic stability criteria and 'N' selected, the thickness remains a primary variable.

By differentiating '$\sigma_p$' in respect to 't' and equating to zero:

$$\frac{\partial \sigma_p}{\partial t} = -\frac{3 M_1}{2N\pi\left(\frac{r}{t}\right)^2 t^4} + C\frac{G\theta}{L} = 0$$

Hence $$t_{opt} = \sqrt[4]{\frac{M_1 \times L \times 3 \times 180}{4\pi^2 N \left(\frac{r}{t}\right)^2 \times G \times \theta^\circ \times c}}$$

The best value of the wall thickness is interpolated between the ultimate principal and fatique optima.

Rotational displacement of one end through a given angular displacement requires a given twisting torque and together they define the torsional stiffness of the array by:

$$\frac{M_x}{\theta^\circ} = \gamma \frac{\pi^2}{270} \frac{N r_m t^3 G}{L} \left[\frac{\text{lb in}}{\text{DEGREE}}\right]$$

Since an open section as defined herein is statically determinate, it has much lower torsional stiffness than a section with a continuous perimeter. Standard metals such as titanum, spring steel, aluminum alloys and the like can be employed in such an array of open sections, however, in using open sections alone, simply increasing wall thickness to prevent elastic instabilities is not feasible since the torsional stiffness is proportional to the third power of thickness. The onset of instabilities of an open section under stress can be expressed and solved by known differential equations. In the elastomeric torsion link of the present invention restraint against lateral deflections is also provided by the layers of elastomeric material between the tubes of the array. The layers will transmit compressive stress caused by radial amplitude advance at the initial stages of buckling, from one lamination to another until it reaches the outer and inner boundary segments. The boundary segments will balance this compressive stress by hoop tension, or, by the tensile stress due to radial precompression. Clearly then, the most preferred embodiments of the present invention would be provided with continuous elastomeric filler between the open sections of the link, in most applications. Some applications could use less than complete filling of the interstitial space between the open section. In addition, transverse deflections during bending, shearing, compressive or tensile loading can be completely suppressed by interactions between the layers and boundary segments. Also, bending moments applied to attachments are transmitted through the fasteners to the thin-walled tubes as shown in the drawings. While this design is capable of deconcentrating high local stress, the end boundary segments should typically be designed to have sufficient bearing area for adequate, gradual diffusion of externally applied bending moments to the tube sides relieving the stress at the fastener.

The torsional stiffness of the elastomeric torsion link of the present invention is proportional to the first power of its diameter. Conventional elastomeric bearings exhibit torsional stiffnesses proportional to higher powers of their outer diameters. Thus, relatively large angular displacements in conventional bearings are difficult to obtain, but can be obtained by the use of the torsion link of the present invention without hinderance from the normally low allowed shear strains of the materials currently available. This phenomenon suggests yet another embodiment of the present invention utilizing a yoke fixed to the restrained end of the present torsion link and extending around the link to a predetermined position along its length where a conventional elastomeric bearing engages the yoke and a sleeve around the torsion link of the present invention. Such a hybrid, while capable of exhibiting the greater angular displacement of the present invention could withstand a greater bending moment so the load carrying capacity utilizing the hybrid would be increased.

Further to the foregoing the elastomer filler while primarily acting as a transverse stabilizer for the open section array can also, by the judicious selection of its hardness with or without the addition of non-rubber-like-materials, be useful for dampening induced oscillations where desirable. This of course suggests that a wide variety of available materials can be employed with particular materials being selected depending on their performance in the array for the particular design application.

Likewise calculations for compression loading comparing an open section and the element of the present invention and test observations confirm that the elastomeric torsion link is more resistant to the onset of local instability under compressive load. Indeed the critical fatigue values for the onset of buckling or other failure modes under twisting torque; compression during shear; and tension during shear are all improved by the elastomeric torsion link of the present invention when compared with the same array of open section members without elastomeric bracing.

For an array it must be assumed that there are 'n' slit tubes whose section constants are analyzed. The pitch '$\delta$' and a uniform slit tube wall thickness '$t_{opt}$' are known quantities from prior calculations.

Since the outer radius rom is divided into 'n' uniform pitches:

$$\delta = \frac{rom}{n}$$

Any slit tube mean radius 'r' may be expressed in terms of the number of pitches from center so $$r_x = \delta X$$

where 'X' is a whole number.
Raising both sides of this relation to the power of 3:

$$r_x^3 = \delta^3 X^3$$

'$r_x^3$' for the expression for the total moment of inertia (second moment of AREA):

$$I = \pi t_{opt} \sum_{x=1}^{x=n} rx^3$$

may be substituted by $\delta^3 x^3$ $$I = \pi t_{opt} \delta^3 \sum_{x=1}^{x=n} x^3$$

i.e. the number of 'X' values is exactly equal to 'n' The sum:

$$\sum_{x=1}^{x=n} X^3$$

can then be expressed as:

$$\sum_{x=1}^{x=n} X^3 = \left[ \frac{n(n+1)}{2} \right]^2$$

therefore $$I = \pi t_{opt} \delta^3 \left[ \frac{n(n+1)}{2} \right]^2 \text{ (in}^4\text{)}$$

and with reference to the initial definitions '$\delta^3$' and 'n' are:

$$\delta 3 = \frac{rom^3}{n^3} \text{ and } n = \frac{rom}{\delta}$$

Substituting into the expression for 'I'

$$I = \frac{\pi}{4} t_{opt} \frac{rom^3}{n^3} n^4 \left( 1 + \frac{2}{n} + \frac{1}{n^2} \right)$$

and therefore, $$I = \frac{\pi}{4} t_{opt} rom^3 n \left( 1 + \frac{2}{n} \frac{1}{n^2} \right)$$

and substituting $$n = \frac{rom}{\delta}$$

$$I = \frac{\pi}{4} \frac{t_{opt}}{\delta} rom^4 \left( 1 + \frac{2\delta}{rom} + \frac{\delta^2}{r_{om}^2} \right) \text{ (in.}^4\text{)}$$

The second and third terms within parentheses are much smaller than the first.

If rom/$\delta$=10, then the third term may be regarded as an infinitesimal of the second order and neglected during the design stress and stress analysis.

In case of the total cross-sectional area $$A = 2\pi t_{opt} \sum_{x=1}^{x=m} r_x \text{ (in}^2\text{)}$$

-continued $$r_x = \delta X$$

$$\sum_{x=1}^{x=n} r_x = \delta \sum_{x=1}^{x=n} X$$

and $$\sum_{x=1}^{x=n} X = \frac{n(n+1)}{2}$$

$$A = 2\pi t_{opt} \delta \frac{n(n+1)}{2}$$

$$A = \pi \times \frac{t_{opt}}{\delta} r_{om}^2 \left(1 + \frac{\delta}{r_{om}}\right) \text{ (in}^2\text{)}$$

In the case of an array the torsional stiffness is given by:

$$\left(\frac{M_x}{\theta}\right)_\Sigma = \frac{\pi^2}{270} \frac{t_{opt}^3 G}{L} \times \sum_{x=1}^{x=n} x$$

and the sum of subsequent radii is $$\left(\frac{M_x}{\theta}\right)_\Sigma = \frac{\pi^2}{570} \frac{t_{opt}^3 G}{L} \frac{r_{om}^2}{\delta}\left(1 + \frac{\delta}{r_{om}}\right)$$

Total torsional stiffness, taking into account various secondary effects, by function:

$$\frac{M_x}{\theta} = \left(\frac{M_x}{\theta}\right)_\Sigma \times \gamma$$

When various secondary effects are compared within the "$\gamma$" function it is obvious that the "torsion-flexion" interaction is greatest. This interaction was first investigated by Timoshenko and Wagner.

Its hyperbolic form can be reduced by Taylor's polinomial to read:

$$\frac{AB}{\left[C - \left(\frac{r}{t}\right)\left(\frac{r}{L}\right)\right]}$$

It has been found experimentally that the torsional stiffness of the slit tube array without elastomeric interface will be increased by 15% or by the coefficient 1.15, when elastomeric material is injected:

$$\gamma_{ELASTOMERIC\ TORSION\ LINK} = 1.15 \times \gamma$$

Figure 9:
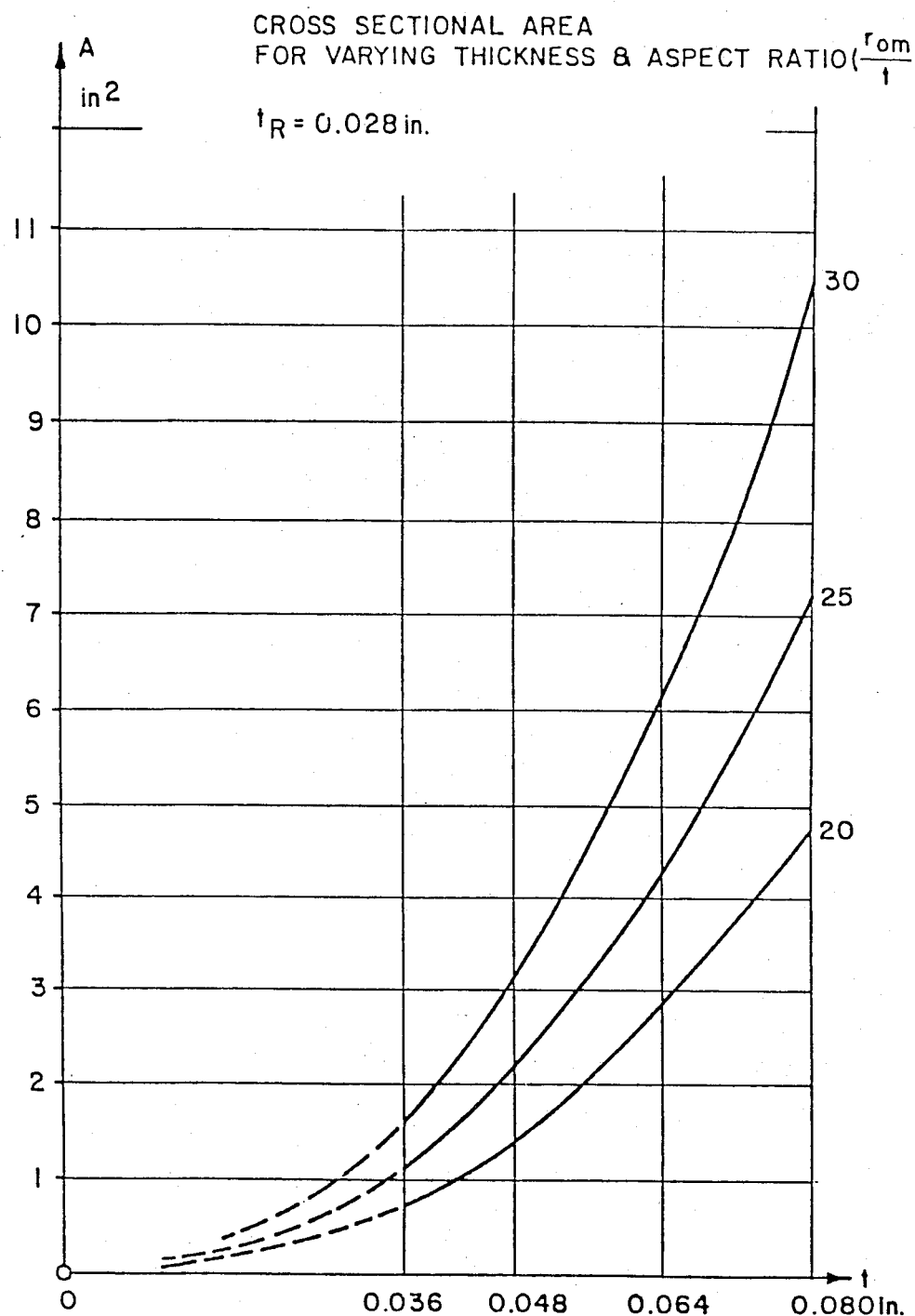
FIGS. 9 to 15 are graphs relating to characteristics of the torsion link.
Figure 10:
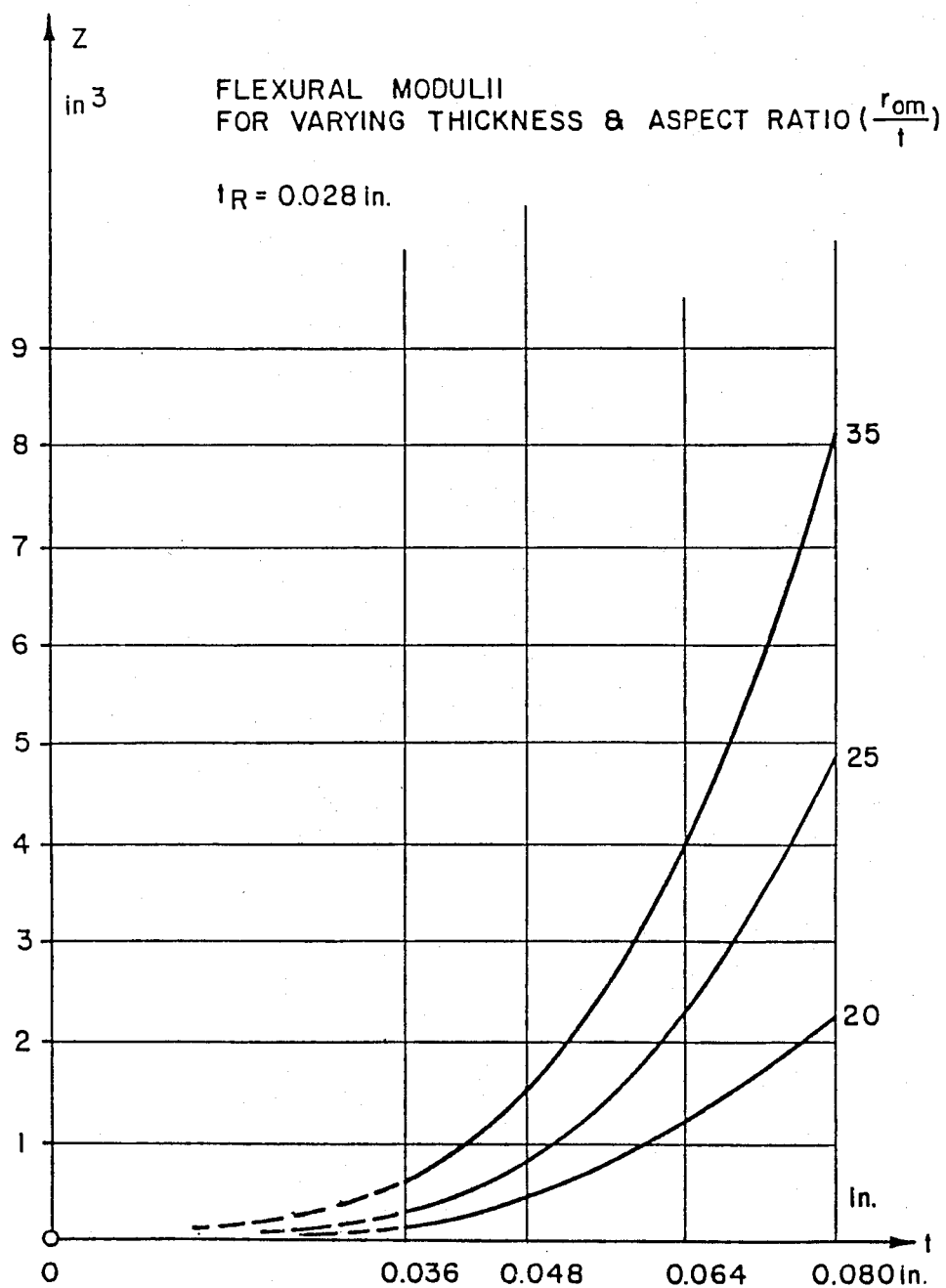
Figure 11:
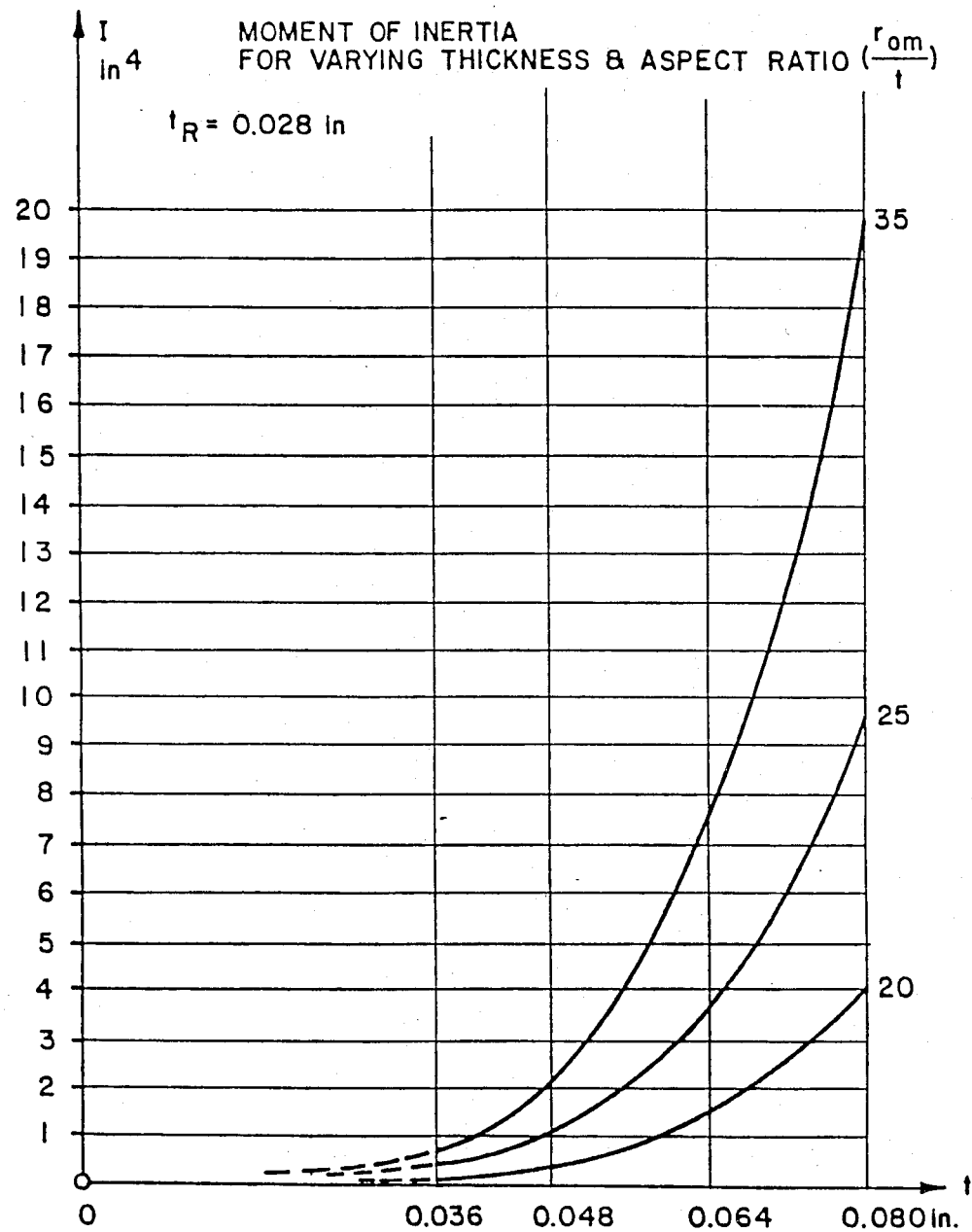
Figure 12:
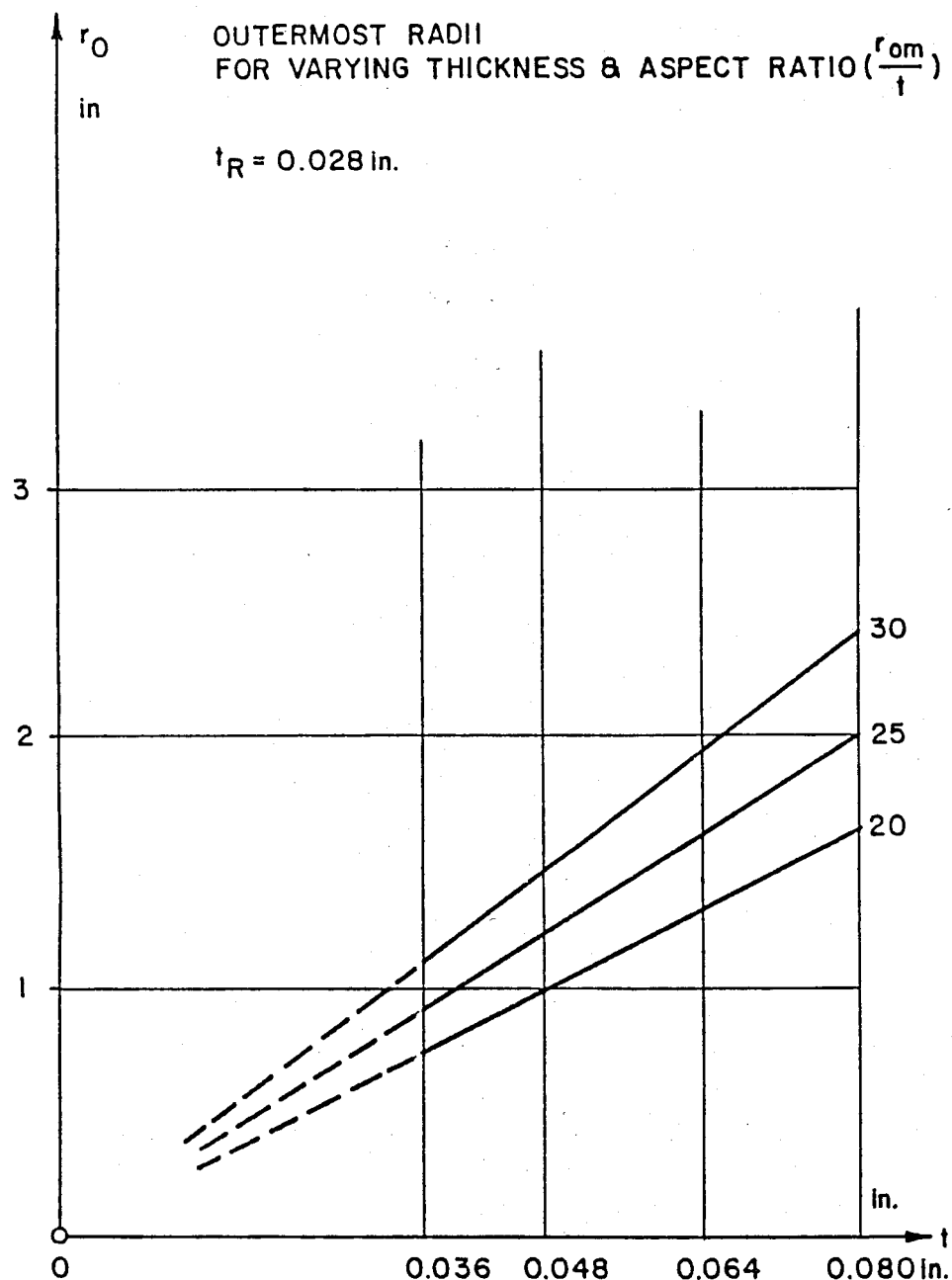
Figure 13:
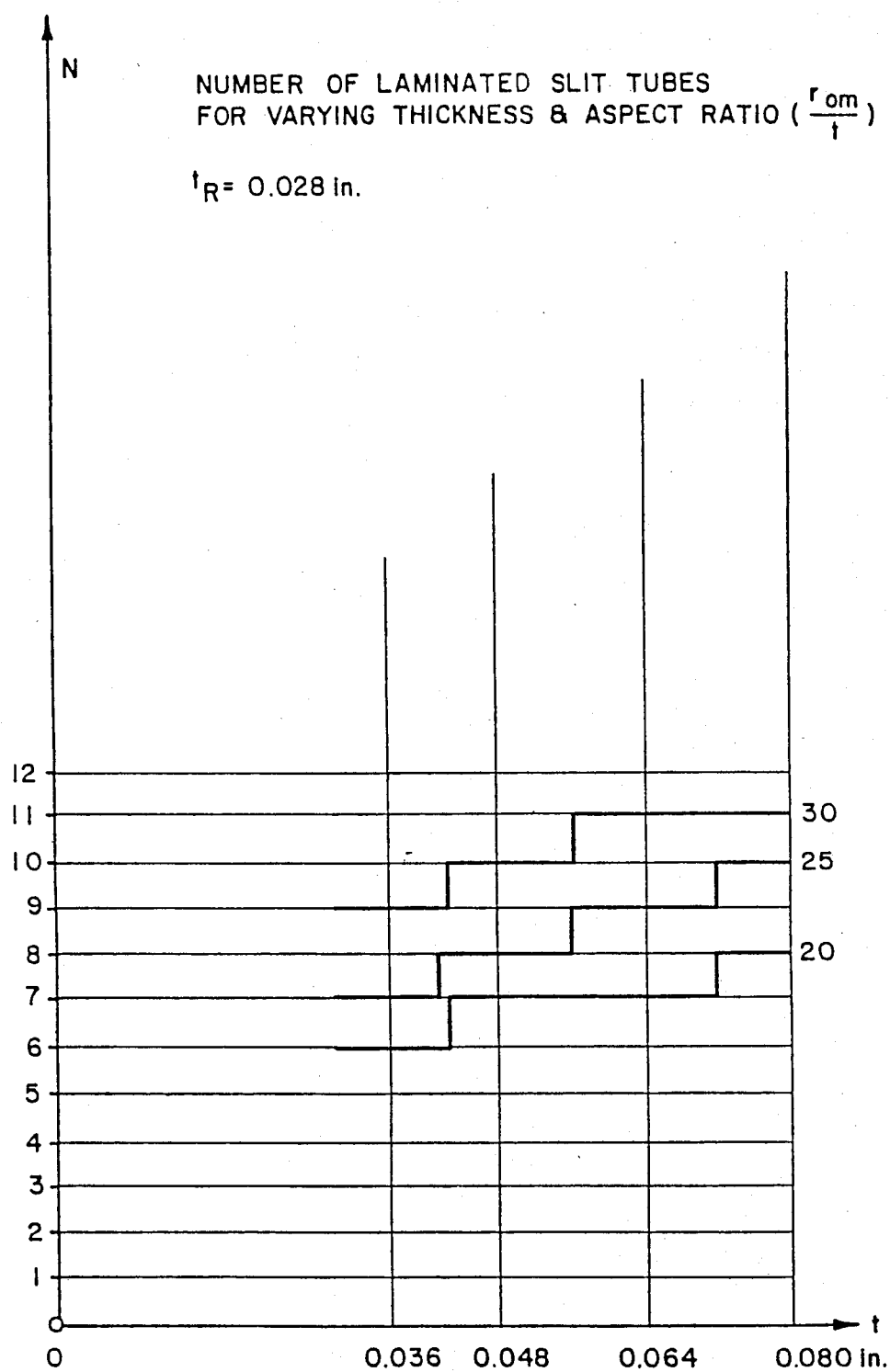
Figure 14:
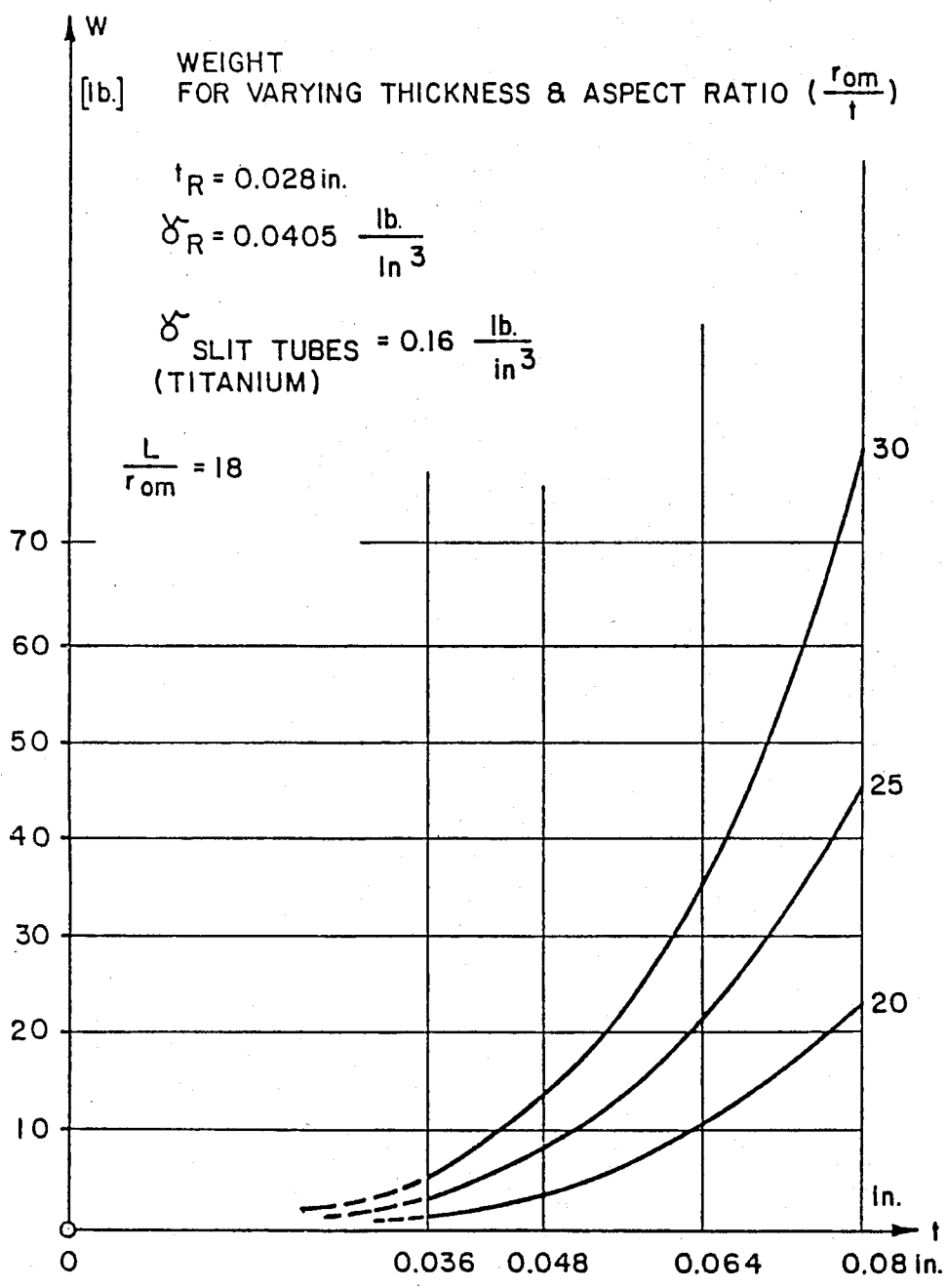
Figure 15:
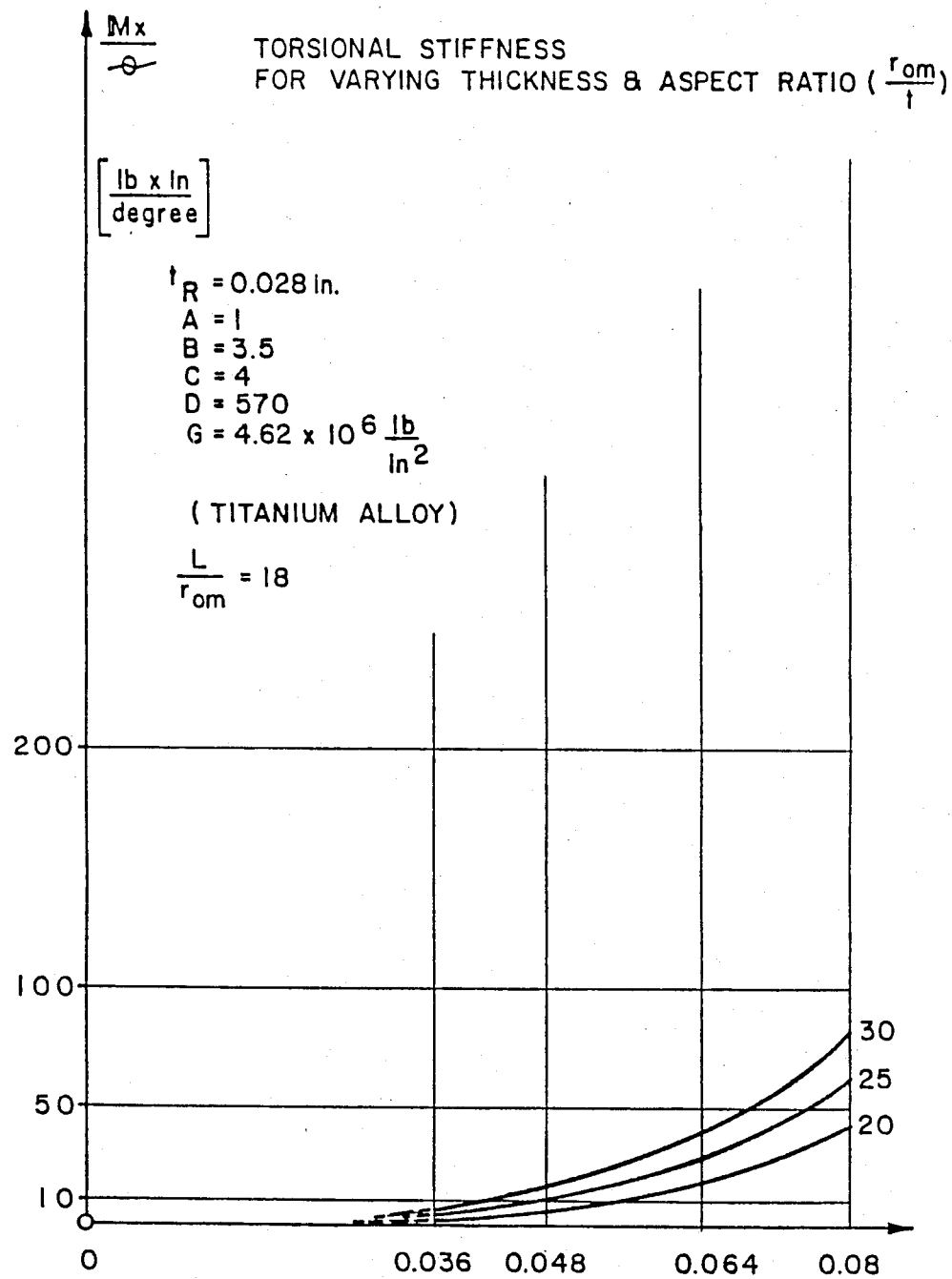

Referring now to FIGS. 9 to 15 these are graphs showing various characteristics of the torsion link for varying thickness and aspect ratio (rom/t). These characteristics are as follows:

| | | |
|---|---|---|
| FIG. 9 | Cross-sectional area | A (in$^2$) |
| FIG. 10 | Flexural modulii | Z (in$^3$) |
| FIG. 11 | Moment of Inertia | I (in$^4$) |
| FIG. 12 | Outermost radii | ro (in) |
| FIG. 13 | Number of laminated slit tubes | N |
| FIG. 14 | Weight | W (lb) |
| FIG. 15 | Torsional stiffness | $\frac{M_x}{\theta}$ |

A thorough analysis of the shear strain in the elastomeric material for any given angular displacement of concentric open sections must be made to determine the optimum spacing and govern material selection.

The analysis must of course be undertaken for any given set of design requirements, for any application, however, it has straight forwardly been determined that the empirical results follow and exceed conventional open section evaluations to an extent that enables the use of the elastomeric torsion link of this invention in applications which hitherto would not have been considered acceptable for open sections alone.

Further analysis following accepted theory demonstrates that the induced by torsion tensile and compressive stresses, for example in the vicinity of the fasteners, are proportional to the shearing stress of a St. Venant's torsion.

The foregoing analysis does of course assume devices constructed with uniform wall thickness. It is contemplated that variations in wall thickness can be employed which will require further analysis to determine suitability of specific structures for specific design applications. Likewise the elastomeric material would vary in thickness in such a situation and this would have to be taken into consideration. For some applications it would even be possible to have discontinuous elastomer filling between the open sections using longitudinal beams or webs of elastomer or even spaced annular rings and it is even further possible to use foamed elastomer or filled elastomer. The selection of the particular elastomer composition or physical shape or form will be straightforwardly achieved by workers in that art given specific design criteria for a given application and the physical data for the elastomer.

I claim:

1. For use in providing a connection between relatively pivotable structural elements spaced from one another on a longitudinal axis, a link comprising: at least one elongate open-section member extending longitudinally of said axis between said elements, said open section member having a transverse web portion at least partially surrounding said longitudinal axis and terminating in elongate free edges movable longitudinally in opposite directions relative to one another when torque is applied to said transverse web portion at longitudinally spaced axial locations, means responsive to relative pivotal motion between said elements at said longitudinally spaced locations for applying a torque to said web portion of said open-section member without substantially constraining said relative movement between said free edges, and means yieldably engaging said open-section member intermediate its ends for stabilizing said web portion transversely under various loads while permitting said relative edge movement when said torque is applied, whereby the connection provided by the link is characterized by axial and transverse strength, high flexural stiffness, and low torsional stiffness.

2. The link according to claim 1 wherein said web portion of said open-section member has inner and outer surfaces, and said stabilizing means includes a layer of elastomeric material engaging at least one of said surfaces transverse to said longitudinal axis.

3. The link according to claim 2 wherein said elastomeric material engages the outer surface of said open-section member.

4. The link according to claim 3 wherein said stabilizing means further includes means surrounding said layer of elastomeric material for cooperating therewith to resist exteriorly distortions in the transverse configuration of said open-section member while enabling said edges to move relative to one another interiorly thereof.

5. The link according to claim 4 wherein said means surrounding said elastomeric material includes a plurality of collars carried on said open-section member at axially-spaced locations.

6. The link according to claim 2 wherein said layer of elastomeric material engages the inner surface of said open-section member and cooperates therewith interiorly thereof to resist interiorly distortions of the transverse configuration of said open-section member while permitting said edges to move relative to one another exteriorly thereof.

7. The link according to claim 6 wherein said stabilizing means includes a plurality of members of elastomeric material engaging said inner surface of said open-section member at axially-spaced locations.

8. The link according to claim 1 wherein said open-section member has inner and outer surfaces and said stabilizing means includes a layer of elastomeric material engaging each of said surfaces, and including means surrounding exteriorly the elastomeric layer on the outer surface of said open section member and means extending interiorly of the elastomeric layer on the inner surface of said open section member.

9. The link according to claim 1 wherein said torque-applying means includes elastomeric means engaged between said open-section member web portion and at least one of said relatively pivotable structural elements to provide therebetween an elastic shear connection which permits said elongate edges to move relative to one another without substantial constraint during application of said torque.

10. The link according to claim 1 wherein said torque-applying means includes means intermediate the elongate edges of said open-section member providing a rigid connection of the web portion thereof to at least one of said structural elements and means providing a non-frictional connection between said structural elements and the periphery of said open-section member web portion, whereby said elongate edges can move without substantial constraint during application of torque.

11. The link according to claim 10 wherein said torque-applying means includes a fastener rigidly connecting the web portion of said open-section member to one of said structural elements.

12. The link according to claim 1 wherein said stabilizing means includes at least one other companion open-section member substantially coextensive in length with said first-mentioned open-section member and also having a pair of elongate free edges, said open-section members being arranged with web portions thereof disposed in mutually spaced overlapping relation for providing said link with a tube-like configuration, a layer of elastomeric material interposed between said overlapping web portions to permit said relative movement of said elongate free edges upon application of said torque, and means adjacent opposite ends of said companion member for applying torque to said companion member in response to relative pivotal movement of said structural elements without substantially constraining said longitudinal movement of the edges.

13. The link according to claim 12 wherein said open-section members are nested together with web portions of one open-section member being contained within web portions of its companion open-section member.

14. The link according to claim 12 wherein said open-section members have similar transverse configurations and are interarranged with a portion of the web portion of one open-section member spanning across a gap defined between the elongate edges of its companion open-section member to provide said link with a closed tube-like configuration.

15. The link according to claim 14 wherein the transverse configurations of said open-section members are substantially circular and the elongate edge gaps of said open-section members are disposed on diametrically-opposite sides of said longitudinal axis.

16. The link according to claim 15 wherein said layer of elastomeric material surrounds said one open-section member and spans across said gap between its elongate edges.

17. The link according to claim 12 wherein said elastomeric material is bonded to said open-section members substantially coextensive with their lengths to provide an elastic shear connection therebetween.

18. The link according to claim 1 wherein said open-section member is fabricated of metal and said stabilizing means is fabricated of a pliable composition.

19. The link according to claim 18 wherein said pliable composition includes an elastomeric material.

20. The link according to claim 19 wherein said elastomeric material includes a natural or synthetic rubber or mixture thereof.

21. The link according to claim 20 wherein said elastomer material is bonded to said open-section member.

22. The link according to claim 1 including another open-section member nested within said one open-section member with the elongate edges of each being offset angularly, and wherein said torque-applying means for both of said members includes a fastener engaging the web portion of one and extending between the elongate edges of the other for effecting a connection of said link to said structural elements.

23. The link according to claim 22 wherein the elongate edges of said open-section members have zones of greater separation adjacent opposite ends thereof, and said fastener passes between said edges in said zones of greater separation.

24. A link of low torsional stiffness, high flexural stiffness, and axial and transverse strength rendering it useful in reacting to various axial, transverse and flexural loads, comprising:

at least a pair of elongate open-section members having complementary transverse cross-sections about a longitudinal axis, each open-section member having a pair of longitudinal edges extending substantially parallel to said axis between opposite ends of said members, said edges being movable longitudinally relative to one another when a torque is applied to each open-section member, said open-section members being interarranged with portions overlapping to provide a closed tube-like configuration, means at axially-spaced locations adjacent the ends of said open-section members for applying torque to said link, and resilient stabilizer means interposed between said overlapping portions of said open-section members for maintaining the same separated from one another while yieldingly permitting said relative edge motion upon application of said torque.

25. The link according to claim 24 wherein said resilient stabilizer means includes at least one band of elastomeric material surrounding said interarranged open-section members.

26. The link according to claim 24 wherein said resilient stabilizer means includes at least one body of elastomeric material disposed interiorly of said interengaged open-section members.

27. The link according to claim 24 wherein said open-section members have substantially circular cross-sections and are nested together with the edges of the members being offset angularly with respect to one another.

28. The link according to claim 24 wherein said resilient stabilizer means includes a layer of elastomeric material extending continually between said overlapping portions.

29. The link according to claim 24 wherein said torque-applying means includes means for providing a non-frictional shear connection between at least one end of said open-section members and a structural element to enable said edges to move lengthwise in opposite directions without substantial constraint.

30. A torsion link capable of carrying various axial, transverse, and flexural loads, comprising:
at least one open-section member having a transverse tube-like cross-section with respect to a longitudinal axis, said open-section member having a pair of edges extending lengthwise of said axis in substantially parallel relation with the spacing between said edges being less than half the extent of said cross-section,
means for applying torque to said open-section member at axially-spaced locations, and
stabilizer means yieldingly engaging said open-section member intermediate said axially-spaced locations for sustaining said transverse cross-section during load application and resiliently accommodating relative motion between said edges when torque is applied,
whereby the torsion link is characterized by axial and transverse strength, high flexural stiffness, and low torsional stiffness.

31. A link, comprising:
at least one pair of elongated, thin-wall open-section members each having a tube-like configuration and a pair of longitudinal edges separated from one another,
said open-section members being interarranged with a portion of one overlapping a portion of the other for a substantial portion of their respective lengths,
a layer of elastomeric material engaged between said overlapping portions of said open-section members to separate the same while permitting lengthwise relative motion between each pair of edges when a torque is applied to each member,
means at axially-spaced locations adjacent opposite ends of said open-section members for applying torque to both of said open-section members at different angular locations at each end thereof with the angular locations of torque application to each member being opposite its respective pair of edges,
whereby the elastomeric layer permits relative movement between the edges when a torque is applied to the link and cooperates to stabilize the open-section members during application of other loads.

32. The link according to claim 31 wherein said pairs of edges are coextensive in length with said open-section members and are offset angularly to define a closed tube.

33. The link according to claim 31 wherein said torque-applying means includes a cap surrounding said open-section members at each end, a layer of elastomeric material engaged between said cap and said open-section members, and fasteners extending radially between the longitudinal edges of the open-section members for connecting the open-section members to said cap at angularly offset end locations.

34. The link according to claim 31 including elastomeric layers surrounding said open-section members exteriorly and interiorly thereof intermediate their ends.

35. A torsion link for interconnecting separate structural elements relatively pivotable about an axis, said link being characterized by low torsional stiffness and by high axial, transverse and flexural strength, comprising:
an elongate open-section member extending longitudinally in generally parallel relationship to said axis and extending transversely in at least a partially encircling relationship to said axis;
said member having opposite longitudinal edge portions and an intervening portion disposed between said edge portions, said edge portions of said member being substantially freely movable longitudinally in opposite directions in response to the application of torque to said wall member at longitudinally spaced locations upon said intervening portion of said member;
means for applying torque to said member at said locations in response to relative pivotal movement between said structural elements while permitting said longitudinal movement of said edge portions of said member to occur substantially freely; and
stabilizing means engaging said member intermediate its opposite ends for enhancing the transverse and flexural strength of said member while permitting said longitudinal movement of said edge portions thereof to occur substantially freely.

36. A torsion link as in claim 35 wherein the transverse extent of the intervening portion of said member is greater than the transverse extent between the edge portions thereof.

37. A torsion link as in claim 35 wherein the transverse extent of said member is defined by an arc subtended by an angle in excess of 180°.

38. A torsion link as in claim 35 wherein said torque-applying means engages only said intervening portion of said member.

39. A torsion link as in claim 35 wherein said stabilizing means includes elastomeric material laterally engaging said member.

40. A torsion link for interconnecting structural elements spaced from each other along and relatively pivotal about a longitudial axis, said link having low torsional stiffness and high axial, transverse and flexural strength, comprising:
a plurality of nested together open-section members extending longitudinally in generally parallel relationship to said axis, and extending transversely in at least partially encircling relationship to said axis;
each of said members having opposite longitudinal edge portions and an intervening portion disposed between said edge portions;

said edge portions of said members, along at least a major portion of the length thereof, being in spaced non-engaging relationship to one another and being freely movable longitudinally relative to one another in response to the application of torque to said members adjacent opposite ends thereof;

means for applying torque to said members adjacent said opposite ends thereof in response to relative rotation between said elements while permitting said longitudinal movement of said edge portions of said members to occur substantially freely; and stabilizing means disposed between confronting surfaces of said members for enhancing the transverse and flexural strength of said link.

41. A torsion link characterized by low torsional stiffness under torsional loading, and by low deformation under transverse and flexural loading, comprising:

at least one elongate open-section member extending longitudinally in generally parallel relationship to a central axis, and extending transversely in at least partially encircling relationship to said axis through an arc having a magnitude in excess of 180°;

said open-section member having first and second longitudinally extending edge portions, and first and second opposite end portions;

a first and second mounting means respectively associated with said first and second end portions of said open-section member for applying a torque thereto and for permitting substantially free movement of said edge portions of said member relative to each other and relative to at least one of said mounting means in response to said applied torque; and stabilizer means yieldingly engaging said open-section member intermediate said first and second mounting means for resisting deformation of said open-section member under transverse and flexural loading while resiliently accommodating said relative motion between said edge portions under torque loading of said member.

42. The torsion link according to claim 41 wherein said open-section member end edge portions are relatively freely movable with respect to both of said first and second mounting means.

43. A torsion link for interconnecting structural elements spaced from each other along and relatively rotatable about an elongate axis, said link being characterized by low torsional stiffness upon torsional loading and by a low deformation upon flexural loading, comprising:

an elongate open-section member extending longitudinally in generally parallel relationship to said axis and extending transversely in at least partially encircling relationship to said axis;

said member having opposite longitudinal edge portions and an intervening portion disposed between said edge portions;

first and second torque-applying means adjacent first and second opposite ends of said member and connectable with respective ones of said spaced structural elements for applying torque to said member in response to relative pivotal movement between said structural elements, at least one of said torque-applying means rigidly engaging said member only at said intervening portion thereof and being in spaced non-engaging relationship to said edge portions of said member; and stabilizing means engaging said open-section member intermediate said opposite ends thereof for minimizing deformation thereof under flexural loading without significantly increasing the low torsional stiffness of said member under torsional loading.

44. The link according to claim 43 wherein both of said torque-applying means are in spaced non-engaging relationship to said edge portions of said member.

* * * * *